United States Patent Office 3,509,165
Patented Apr. 28, 1970

3,509,165
PROCESS FOR PREPARING PYRIDINIUM
BETAINES AND DERIVATIVES
Samuel E. Ellzey, Jr., and Wilma A. Guice, New Orleans, and Arthur F. Novak, Baton Rouge, La., assignors to the United States of America as represented by the Secretary of Agriculture
No Drawing. Filed Mar. 24, 1967, Ser. No. 626,373
Int. Cl. C07d 31/34, 31/02; A61k 27/00
U.S. Cl. 260—295                                     9 Claims

ABSTRACT OF THE DISCLOSURE

A method for preparing novel fluorinated pyridinium salts is described. These novel compounds are pyridinium inner salts of fluorinated 2-ketocarboxylic acid hydrates. They are prepared by hydrolysis with strong mineral acids of the corresponding (polyfluorodioxocycloalkyl)pyridinium betaines. In addition to a pyridinium inner salt of a fluorinated 2-ketocarboxylic acid hydrate, the betaine having a four-carbon cycle leads to the novel (3,3-difluoro-2,2-dihydroxypropyl)pyridinium chloride.

The above pyridinium compounds were found to exhibit good antimicrobial activity against S. aureus, E. coli, T. violaceum, and C. albicans.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a method for preparing novel fluorinated pyridinium salts. More specifically, a method is given for the preparation of pyridinium salts of the general formula

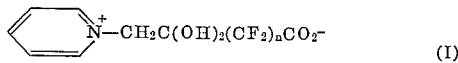

$$\phantom{x}\text{N}^+\!\!-\!\text{CH}_2\text{C}(\text{OH})_2(\text{CF}_2)_n\text{CO}_2^-  \qquad (I)$$

in which $n$ is an integer from 1 to 3.

In brief, pyridinium salts of the above structure are obtained by treating (perfluorodioxocycloalkyl)pyridinium betaines of the general formula

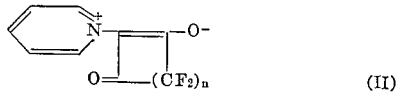

(II)

in which $n$ has the same meaning as above, with hot, aqueous mineral acids such as hydrochloric or sulfuric acid. A method for the prepartion of these fluorinated betaines is disclosed and claimed in U.S. Patent 3,285,926, patented Nov. 15, 1966. In this method, the fluorinated pyridinium betaines (II) are prepared by reaction of fluorinated olefins of the type

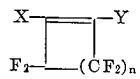

in which X and Y may be Cl or F, and $n$ has the same meaning as above, with pyridine in the presence of water with acetic acid as solvent.

We have now discovered that the reaction of the fluorinated pyridinium betaines (II) with aqueous hydrochloric or sulfuric acid causes ring opening and addition of the elements of water to produce novel and useful pyridinium inner salts of fluorinated keto acid hydrates (I).

In the case of the pyridinium betaines (II) in which $n=1$ or 3, it has been found that refluxing the compounds with concentrated hydrochloric acid converts them into the pyridinium inner salts of the corresponding keto acid hydrates. However, when $n=2$, the same treatment results only in the recovery of practically all of the starting material. Long refluxing with 50% aqueous sulfuric acid, however, furnishes the keto acid inner salt.

In the reaction with hydrochloric acid of the betaine (II) in which $n=1$, the pyridinium inner salt of the keto acid hydrate (I) is the minor product, the major product being (3,3-difluoro-2,2-dihydroxypropyl)pyridinium chloride, which apparently arises from decarboxylation of the minor product.

The pyridinium inner salts of the keto acid hydrates (I) and (3,3-difluoro-2,2-dihydroxypropyl)pyridinium chloride were screened for antimicrobial activity against the gram positive bacterium Staphylococcus aureus, the gram negative bacterium Escherichia coli, the mold Tricophyton violaceum, and the yeast Candida albicans. Difco Bacto dehydrated stock culture agar at pH 7.0, Difco Bacto dehydrated yeast morphology agar at pH 4.5, and Difco Bacto dehydrated mycological agar at pH 7.0 were used to test inhibition of bacteria, yeast, and mold cultures, respectively, on seeded plates. As the results in the following table show, all the pyridinium compounds are active against the bacteria, the mold, and the yeast.

| Compound | Antimicrobial activity [1,2] | | | |
|---|---|---|---|---|
| | A | B | C | D |
| I, n=1 (Example 1) | ++ | ++ | ++ | ++ |
| I, n=2 (Example 2) | ++ | ++ | ++ | ++ |
| I, n=3 (Example 3) | ++ | ++ | ++ | ++ |
| (3,3-difluoro-2,2-dihydroxypropyl) pyridinium chloride (Example 1) | ++ | ++ | ++ | ++ |

[1] A=C. albicans; B=T. violaceum; C=E. coli; D=S. aureus.
[2] ++ Good: the zone of inhibition was at least 0.5 cm. [see Novak, et al. J. Am. Oil Chemists' Soc., 41, 503 (1964)].

All temperatures are degrees centigrade.

EXAMPLE 1

(3,3-difluoro - 2,4-dioxocyclobutyl)pyridinium betaine 2.00 g. (0.01 mole), was refluxed for 4 hrs. with 15 ml. of concentrated hydrochloric acid. The solution was evaporated on a water bath (70°) with an air stream and the residue, after washing with acetone and ether, was dried and weighed 2.28 g. The solid was suspended in about 50 ml. of boiling acetone and a few drops of water were added to bring it into solution. Upon cooling to —35° overnight, 0.22 g. (9%) of water-soluble (3-carboxy-3,3-difluoro-2,2-dihydroxypropyl)pyridinium betaine separated, M.P. 131–132° dec. After recrystallization from aqueous acetone the melting point of the yellow plates was 133–135° decomposed (dec.).

Analysis.—Calc'd for $C_9H_9F_2NO_4$ (percent): C, 46.36; H, 3.89; F, 16.30; N, 6.01. Found (percent): C, 46.54; H, 3.90; F, 16.37; N, 5.85.

The filtrate from the above separation was evaporated to dryness and the water-soluble residue was recrystallized from a large volume of acetone containing a few drops of water to aid dissolution. Upon cooling to —35°, colorless needles, 1.32 g. (58%), M.P. 158–160° dec., of (3,3-difluoro-2,2-dihydroxypropyl)pyridinium chloride separated. Further recrystallization gave an analytical sample, M.P. 161–162° dec.

Analysis.—Calc'd for $C_8H_{10}ClF_2NO_2$ (percent): C, 42.58; H, 4.47; F, 16.84; N, 6.21. Found (percent): C, 42.67; H, 4.53; F, 17.01; N, 6.00.

EXAMPLE 2

(3,3,4,4 - tetrafluoro-2,5-dioxocyclopentyl)pyridinium betaine, 3.00 g. (0.012 mole), was refluxed 15 hrs. with 25 ml. of 50% sulfuric acid. The mixture was poured into 150 ml. of water, cooled, filtered, and the precipitate was washed with water. The solid was extracted with hot acetone to remove the soluble starting material (28% recovery). The insoluble (4-carboxy-3,3,4,4-tetrafluoro-2,2- dihydroxybutyl)pyridinium betaine, 1.71 g. (50%), was recrystallized from hot water, M.P. 204–205° dec.

*Analysis.*—Calc'd for $C_{10}H_9F_4NO_4$ (percent): C, 42.41; H, 3.20; F, 26.84; N, 4.95; neut. equiv., 283. Found (percent): C, 52.60; H, 3.25; F, 26.77; N, 4.91; neut. equiv., 261.

EXAMPLE 3

(3,3,4,4,5,5-hexafluoro-2,6-dioxocyclohexyl)pyridinium betaine, 2.00 g. (0.0067 mole), was stirred at reflux for 4 hrs. with 15 ml. of concentrated hydrochloric acid. After cooling and filtering, the product was washed with water, dried, and washed with acetone, 1.00 g. (45%). Recrystallization from hot water gave white needles of (5-carboxy-3,3,4,4,5,5 - hexafluoro-2,2-dihydroxypentyl)- pyridinium betaine, M.P. 170–171° dec.

*Analysis.*—Calc'd for $C_{11}H_9F_6NO_4$ (percent): C, 39.65; H, 2.72; F, 34.22; N, 4.20; neut. equiv., 333. Found (percent): C, 39.54; H, 2.76; F, 34.06; N, 4.02; neut. equiv., 330.

We claim:
1. A process for preparing pyridinium inner salts of fluorinated keto acid hydrates of the formula

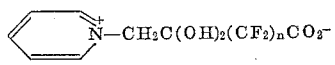

wherein $n$ is an integer from 1 to 3, which process comprises the following steps:
(a) reacting a (perfluorodioxocycloalkyl)pyridinium betaine of the type

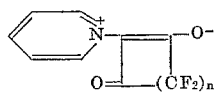

wherein $n$ has the same meaning as above, with a strong mineral acid selected from the group consisting of hydrochloric acid and sulfuric acid; said hydrochloric acid not being employed when $n=2$;
(b) removng the strong mineral acid;
(c) recovering the residual product of step (b);
(d) removing water-soluble compounds by dissolution in water; and
(e) drying the water-insoluble product.

2. The process of claim 1 wherein $n=1$ and the strong mineral acid is hydrochloric acid.
3. The process of claim 1 wherein $n=2$ and the strong mineral acid is sulfuric acid.
4. The process of claim 1 wherein $n=3$ and the strong mineral acid is hydrochloric acid.
5. (3 - carboxy-3,3-difluoro-2,2-dihydroxypropyl)pyridinium betaine.
6. (4 - carboxy-3,3,4,4-tetrafluoro-2,2-dihydroxybutyl)- pyridinium betaine.
7. (5-carboxy-3,3,4,4,5,5-hexafluoro-2,2-dihydroxypentyl)pyridinium betaine.
8. A process for preparing (3,3-difluoro-2,2-dihydroxypropyl)pyridinium chloride, which process comprises the steps:
(a) reacting (3,3-difluoro-2,4-dioxocyclobutyl)pyridinium betaine with hydrochloric acid;
(b) removing the hydrochloric acid by evaporation;
(c) recovering the residual product of step (b);
(d) removing the water-soluble product of step (c) by dissolution in water; and
(e) recovering the dissolved water-soluble product by evaporation of the water.
9. (3,3-difluoro-2,2-dihydroxypropyl)pyridinium chloride.

References Cited

Ellzey et al.: J. Org. Chem. vol. 31, No. 4 pp. 1300–1302, April (1966) QD 241 J6.

Ellzey et al.: Chem. Abstracts, vol 65, par. 3827, August (1966).

HENRY R. JILES, Primary Examiner

A. L. ROTMAN, Assistant Examiner

U.S. Cl. X.R.

260—297; 424—266